May 28, 1946.  W. ROSETT  2,401,191
TELESCOPE FOR RECEIVING AND DETECTING ULTRA-VIOLET LIGHT
Filed Oct. 2, 1931  3 Sheets-Sheet 1
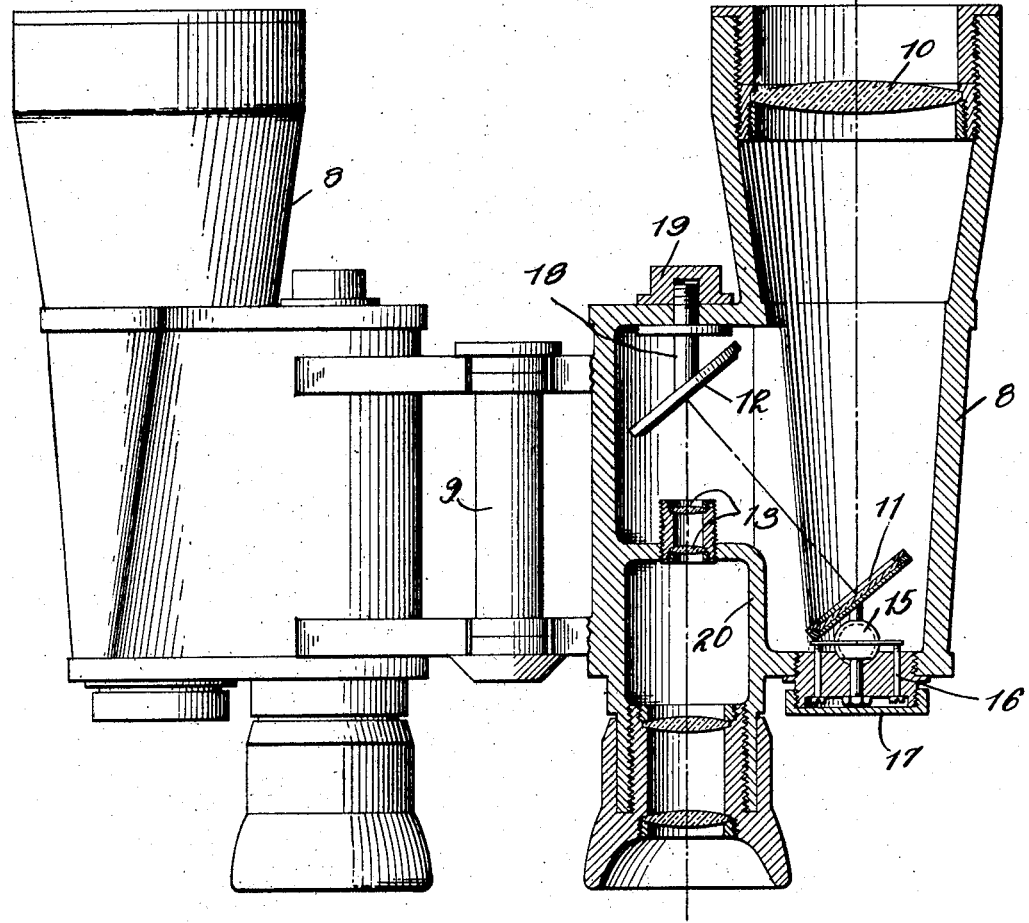
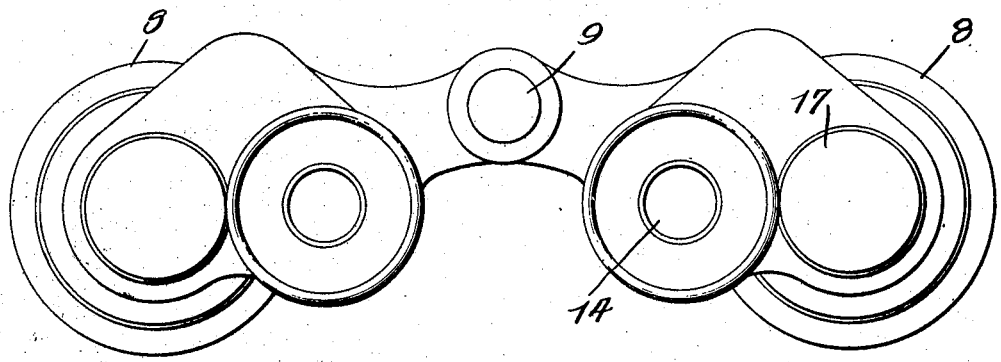
INVENTOR
*Walter Rosett*
BY
ATTORNEY

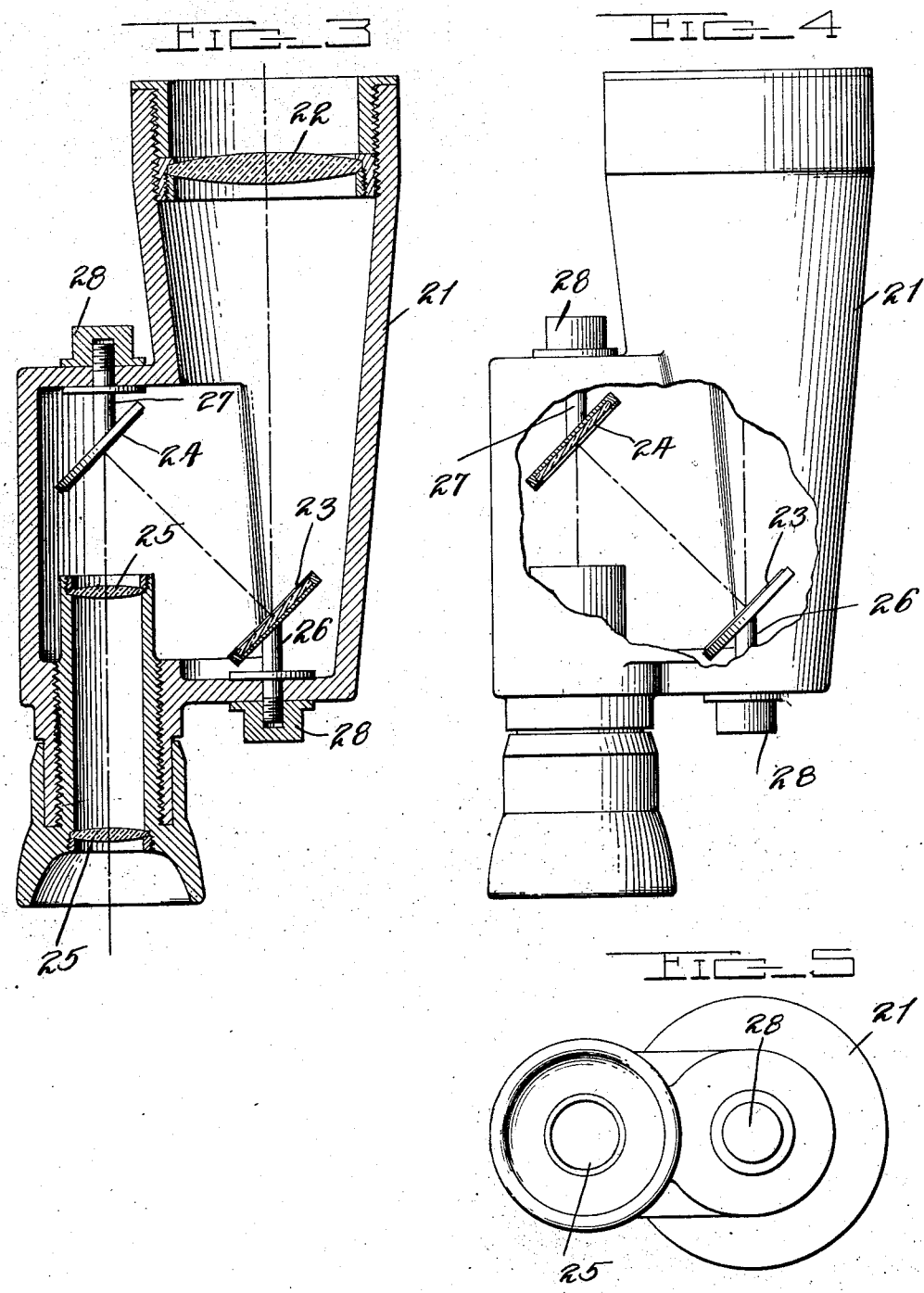

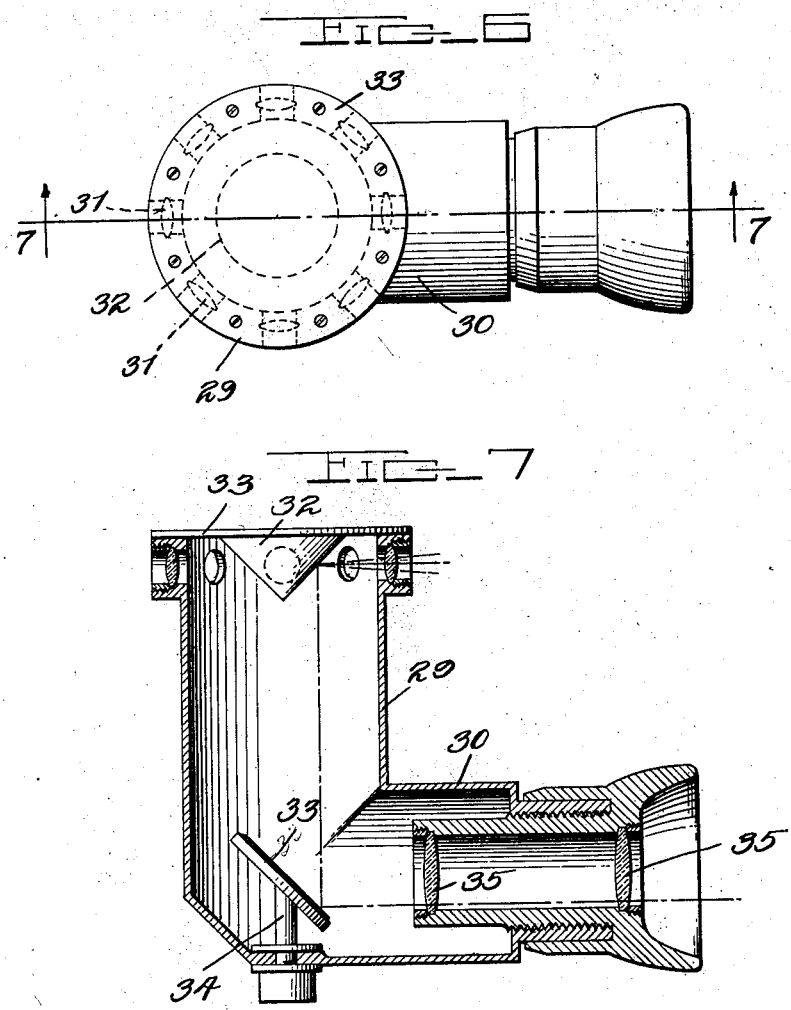

Patented May 28, 1946

2,401,191

UNITED STATES PATENT OFFICE 2,401,191

TELESCOPE FOR RECEIVING AND DETECTING ULTRAVIOLET LIGHT

Walter Rosett, Washington, D. C., assignor to the United States of America, as represented by the Secretary of the Navy Application October 2, 1931, Serial No. 566,593

4 Claims. (Cl. 88—32)

This invention relates to an optical instrument for receiving and detecting ultra-violet light by the fluorescence excited by such light on a suitable screen therein.

It is the object of my invention to provide an instrument in which the effective fluorescence will be a maximum through being viewed from the same side of the screen as that on which the light is incident, while at the same time the observer is facing the source of light.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Figure 1 shows my invention embodied in a binocular, with one part in longitudinal section to disclose the optical system;

Figure 2 is a view of the ocular end of the device;

Figure 3 is a longitudinal section of a monocular glass made according to my invention;

Figure 4 is a side view of a monocular, with part of the body cut away to show the arrangement of the screen and mirror;

Figure 5 is an ocular end view of the monocular embodiment of my invention;

Figure 6 is a side view of a form of my invention with which it is possible to receive ultra-violet light from any direction, and Figure 7 is a sectional view taken on the line 7—7 on Figure 6.

It has heretofore been proposed to use ultra-violet light for secret communication and to illuminate objects in such manner that the objects should not then be visible to the eye without the aid of especially constructed instruments. The devices heretofore employed for detecting such light have a fluorescent screen in the focal plane, but in these the effective fluorescence is much reduced by absorption of a considerable portion of the fluorescent light in the transparent base of the screen. My invention obviates this disadvantage by viewing the screen from the same side as that on which the light impinges, and hence avoids the necessity of transmitting it through the screen.

As in the ordinary binocular, my invention as shown in Figure 1 includes the two body members 8 hingedly connected together by a pintle 9. In one end of each member 8 is an objective lens 10 of quartz or any suitable material that is transparent to ultra-violet light. In some cases it may be desirable to make the objective of a material which is transparent to ultra-violet light and opaque to light which is visible to the unaided eye.

Light from objective 10 is reflected from mirror 11 to fluorescent screen 12 excitable by the ultra-violet rays. The rays from screen 12 pass through erecting lenses 13 on to the ocular lenses 14. Mirror 11 may be of metal or other suitable material, and is mounted on a ball joint 15 with four screws 16 to adjust the mirror for collimation. A screw cap 17 protects screws 16 against moisture, accidental movement that would throw mirror 11 out of position, and also prevents the entry of light. Screen 12 is carried on a stem 18 secured to body 8 by cap nut 19 and is readily adjustable to any desired position. Partition 20 prevents access to the ocular system of stray light that would obscure the fluorescence of screen 12. If found advantageous, the positions of screen 12 and mirror 11 may be interchanged.

In Figures 3.5 my invention is shown embodied in a monocular type of glass, in which the body 21 contains an objective lens 22 of quartz or other suitable substance. Light from objective 22 passes to mirror 23 whence it is reflected to fluorescent screen 24, and from the screen the fluorescent light passes to ocular lenses 25. Mirror 23 and screen 24 are carried on stems 26 and 27, respectively, which pass through body 21 and are secured by cap nuts 28, whereby the mirror and screen are readily adjustable to the required relative positions.

Figures 6 and 7 disclose a modification of my invention whereby a single observer is able at all times to receive ultra-violet light signals from the entire azimuthal circle. The body in this case has two portions 29 and 30 at right angles to each other. Around the free end of portion 29 at intervals of a few degrees are disposed quartz objective lenses 31 the light from which is focussed upon conical fluorescent screen 32 carried by closure 33 for the free end of portion 29. A mirror 33 is mounted on stem 34 in the elbow at the junction of portions 29 and 30 to reflect the fluorescent light from screen 32 to lenses 35 in the ocular of the instrument. It is apparent that when this instrument is held with the portion 29 in a vertical position ultra-violet light coming from any direction will cause fluorescence of screen 32 and will be detected by the observer using the instrument which will enable a limited personnel to maintain an effective lockout in all directions for signals transmitted by means of ultra-violet light.

Obviously, if found desirable, the conical element 32 could be made a mirror and the plane element 33 could be the fluorescent element.

It is apparent that with any of the modifications of my invention disclosed herein the fluorescence may be observed from the same side of the screen as that on which the light is incident while the observer is facing the source of light.

It will be understood that the above description and accompanying drawings comprehend only the general and preferred embodiment of my invention, and that various changes in construction, proportion and arrangement of parts may be made within the scope of the appended claims, and without sacrificing any of the advantages of my invention.

I claim:

1. An optical instrument comprising two movably connected substantially tubular body members, each of said members having an offset portion, each of said members having an objective lens transparent to ultra-violet light in one end, a ball joint device in the opposite end of the same portion, means for adjusting said device from outside said body, an inclined mirror mounted on said device to receive light from said objective, a fluorescent screen mounted in inclined position in the end of said offset portion opposite said mirror to receive light reflected from said mirror, and a system of lenses mounted in said offset portion to erect the image and to view the fluorescence of said screen from the same side of said screen as the light is incident thereon.

2. An optical instrument comprising a body member having two portions substantially at right angles to each other, a plurality of lenses transparent to ultra-violet light disposed circumferentially around one end of said portions, a conical fluorescent screen so disposed that the light from said lenses is focused thereon, an ocular system in the other body portion, and a mirror so disposed that the fluorescence of said screen may be viewed through said ocular system.

3. An optical instrument comprising a substantially tubular body member having an offset portion, an objective lens transparent to ultra-violet light in one end of said member, a hollow substantially spherical socket having an equatorially disposed flange and a stem at right angles to said flange, a reflecting element carried by said stem at an angle of 45° thereto, a ball in said socket having a stem extending through the end of said member opposite said lens, means on said ball stem to draw said ball tightly against said socket, a plurality of threaded members extending through said opposite end and cooperating with said flange to adjust the position of said socket on said ball, a fluorescent screen mounted in an inclined position in the end of said offset portion opposite said mirror to receive light reflected from said mirror and a system of lenses mounted in said offset portion to erect the image and to view the fluorescence of said screen from the same side of the said screen as the light is incident thereon.

4. An optical instrument comprising two movably connected substantially tubular body members, each of said members having an offset portion, each of said members having an objective lens transparent to ultra-violet light in one end, two hollow substantially spherical sockets each having an equatorially disposed flange and a stem at right angles to said flange, a reflecting element on each said stem at an angle of 45° thereto, a ball in each said socket having a stem extending through the end of a body member respectively opposite said lens, means on each ball stem to draw the ball tightly against the socket, a plurality of threaded members through each said opposite end coacting with the respective flange to fix the position of the socket on the ball, a fluorescent screen mounted in inclined position in the end of each said offset portion opposite the respective mirror to receive light reflected from said mirror and a system of lenses mounted in each said offset portion to erect the image and to view the fluorescence of said screen from the same side of said screen as the light is incident thereon.

WALTER ROSETT.